United States Patent
Reina et al.

(10) Patent No.: US 12,124,494 B2
(45) Date of Patent: Oct. 22, 2024

(54) SYSTEMS AND METHODS FOR PRESENTING DATA WITH DEGREES OF INTEREST

(71) Applicant: 4I ANALYTICS, INC., Indianapolis, IN (US)

(72) Inventors: Gabriel E. Reina, Tucsan, AZ (US); Thomas R. Hershberger, Indianapolis, IN (US)

(73) Assignee: Degrees of Interest, Inc., Arlington, VA (US)

( * ) Notice: Subject to any disclaimer, the term of this patent is extended or adjusted under 35 U.S.C. 154(b) by 0 days.

(21) Appl. No.: 18/405,872

(22) Filed: Jan. 5, 2024

(65) Prior Publication Data

US 2024/0232246 A1    Jul. 11, 2024

Related U.S. Application Data

(60) Provisional application No. 63/437,550, filed on Jan. 6, 2023.

(51) Int. Cl.
  *G06F 17/00*    (2019.01)
  *G06F 16/338*   (2019.01)
  *G06F 16/35*    (2019.01)

(52) U.S. Cl.
  CPC .......... *G06F 16/358* (2019.01); *G06F 16/338* (2019.01)

(58) Field of Classification Search
  CPC ............................. G06F 16/358; G06F 16/338
  See application file for complete search history.

(56) References Cited

U.S. PATENT DOCUMENTS

| | | | |
|---|---|---|---|
| 7,739,229 B2* | 6/2010 | Ames | G06Q 30/02 707/610 |
| 8,732,584 B2* | 5/2014 | Lee | G06Q 10/10 715/733 |
| 9,977,818 B2* | 5/2018 | Raina | G06T 3/40 |
| 2007/0188494 A1 | 8/2007 | Agutter | |
| 2015/0220535 A1 | 8/2015 | Palmer | |
| 2015/0370883 A1* | 12/2015 | Kalki | G06F 16/185 707/600 |

OTHER PUBLICATIONS

Farzad Eskandanian et al., A Clustering Approach for Personalizing Diversity in Collaborative Recommender Systems. In Proceedings of the 25th Conference on User Modeling, Adaptation and Personalization. Association for Computing Machinery, 280-284. <ttps://doi.org/10.1145/3079628.3079699>, Jul. 2017.*

International Search Report and Written Opinion for International patent application No. PCT/US2024/010535, filed Jan. 5, 2024, mailed Apr. 2, 2024.

* cited by examiner

*Primary Examiner* — Greta L Robinson
(74) *Attorney, Agent, or Firm* — Faegre Drinker Biddle & Reath LLP

(57) ABSTRACT

Systems are disclosed including, for example, one or more processors configured to execute the instructions and perform operations including accessing, from a first source, a first dataset; extracting a plurality of data points from the first dataset having a first data point, determining a first degree of interest for the first data point with respect to a center of interest on a first data layer of a plurality of data layers, determining a second degree of interest for the first data point on a second data layer of the plurality of data layers, and aggregating the first degree of interest for the first data point and the second degree of interest for the first data point to determine a first aggregated degree of interest.

29 Claims, 10 Drawing Sheets

SYSTEMS AND METHODS FOR PRESENTING DATA WITH DEGREES OF INTEREST

CROSS REFERENCE TO RELATED APPLICATIONS

This application claims priority to U.S. Provisional Application No. 63/437,550, filed Jan. 6, 2023, incorporated by reference herein for all purposes.

FIELD

The present disclosure relates to systems and methods for presenting data. More specifically, some embodiments of the present disclosure relate to systems and methods for presenting data and relevancy of data.

BACKGROUND

Numerous reports are generated, reviewed, and analyzed every day. Reports can include text and/or data streams. For an investigation, a large number of reports, in text formats and various other formats, are reviewed and processed. Current law enforcement agencies collect and deal with large amounts of data during investigations. Reports are typically manually typed and manually coordinated using tables and spreadsheets with conventional office software, such as Microsoft Word® or Excel®. However, such systems lack the ability to integrate data extracted from various reports and/or present the data in a structured way the various aspects of an investigation, especially for time-sensitive investigations.

SUMMARY

Currently many law enforcement agencies are struggling with unstructured data. When investigations come together a copious amount of data is collected. There is a need to better analyze datasets and identify data outliers in a more automated fashion. At least some systems and methods of the present disclosure are directed to presenting data (e.g., data points, datasets) and showing categories of objects extracted from data points, classified relationships (e.g., closeness or proximity between various objects), and/or object relationships (e.g., ownership interest, family status, etc. between various objects). In certain embodiments, the systems and methods can improve efficiency regarding the presentation of data, for example, from one or more investigations. In some embodiments, the systems and methods can be used to identify outlier data (e.g., outlier objects, outlier data points).

In some embodiments, a data presentation system includes, for example, one or more memories having instructions stored thereon, and one or more processors configured to execute the instructions and perform operations including accessing, from a first source, a first dataset and extracting a plurality of data points from the first dataset. For a first data point of the plurality of data points, the system is configured to determine a first degree of interest for the first data point with respect to a center of interest on a first data layer of a plurality of data layers, determine a second degree of interest for the first data point on a second data layer of the plurality of data layers, and aggregate the first degree of interest for the first data point and the second degree of interest for the first data point to determine a first aggregated degree of interest. In certain embodiments, the system is further configured to present a representation of the first data point based upon the first aggregated degree of interest on a data diagram, the data diagram including a representation of the center of interest and one or more representations of one or more data points of the plurality of data points.

In some embodiments, the system is configured to access, from a second source, a second dataset and extract a plurality of second data points from the second dataset. For a second data point of the plurality of second data points, the system is further configured to determine a first degree of interest for the second data point with respect to a second center of interest on a first data layer of a plurality of data layers, determine a second degree of interest for the second data point on a second data layer of the plurality of data layers, and aggregate the first degree of interest for the second data point and the second degree of interest for the second data point to determine a second aggregated degree of interest. In certain embodiments, the system is further configured to present a representation of the second data point based upon the second aggregated degree of interest on a second data diagram, the second data diagram including a representation of the second center of interest and one or more representations of one or more second data points of the plurality of second data points.

In some embodiments, the system is configured to adjust the first aggregated degree of interest based at least in part on the second dataset, adjust the second aggregated degree of interest based at least in part on the first dataset, present a representation of the first data point based upon the adjusted first aggregated degree of interest on a third data diagram, and present a representation of the second data point based upon the adjusted second aggregated degree of interest on the third data diagram.

The foregoing embodiments are just that, and should not be read to limit or otherwise narrow the scope of any of the inventive concepts otherwise provided by the instant disclosure. While multiple embodiments are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are incorporated in and constitute a part of this specification and, together with the description, explain the features and principles of the present disclosure. In the drawings.

Figure 1:
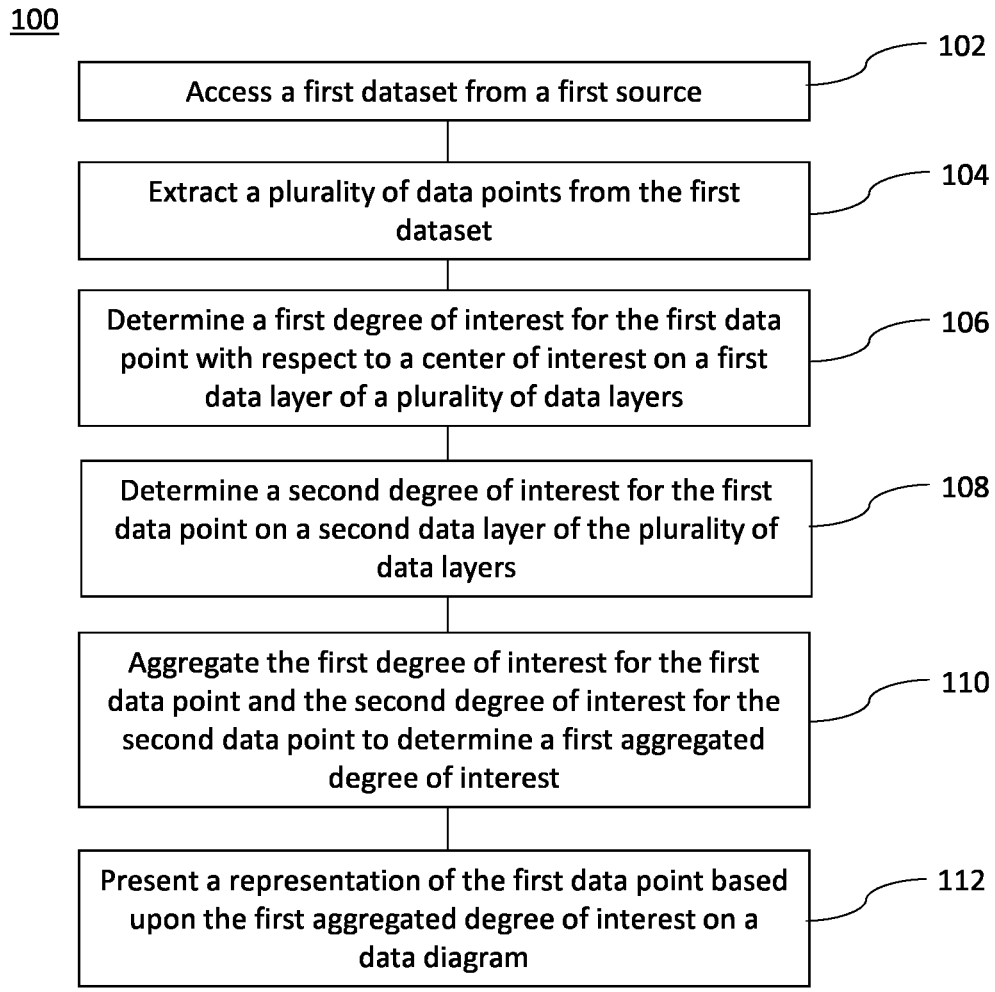
FIG. 1 depicts an illustrative flow diagram showing a method for presenting a plurality of data points, in accordance with certain embodiments of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates an embodiment of the disclosure, in one form, and such exemplifications are not to be construed as limiting the scope of the disclosure in any manner.

DETAILED DESCRIPTION

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

Numerous reports including text or data streams are generated, reviewed, and analyzed every day. For an incident, there are possibly a large number of related investigation reports to review and analyze, leading to an even larger number of data extracted from these reports. As used herein, in some embodiments, a report refers to a data stream retrieved or received from a data source, which can be a text data stream, a codified data stream, a numerical data stream, an alphanumerical data stream, a data record, a file, and/or the like. A need exists to better analyze, structure, and present data obtained from these reports, especially in the context of investigations that are time sensitive.

According to some embodiments of the present disclosure, systems for presenting a plurality of data points are configured to, for example, execute instructions and perform operations including determining a first and second degree of interest for data points extracted from datasets, aggregating the degrees of interest, and presenting a representation of the data point based upon the first aggregated degree of interest on a data diagram, the data diagram including a representation of the center of interest and one or more representations of one or more data points of the plurality of data points.

In some embodiments, the system may be further configured to present a representation of a second data point from a second dataset based upon a second aggregated degree of interest on a second data diagram, adjust the first aggregated degree of interest based at least in part on the second dataset, adjust the second aggregated degree of interest based at least in part on the first dataset, present a representation of the first data point based upon the adjusted first aggregated degree of interest on a third data diagram, and present a representation of the second data point based upon the adjusted second aggregated degree of interest on the third data diagram.

FIG. 1 depicts an illustrative flow diagram showing a method 100 for presenting a plurality of data points, in accordance with certain embodiments of the present disclosure. This diagram is merely an example. One of ordinary skill in the art would recognize many variations, alternatives, and modifications. The method 100 for presenting a plurality of data points includes processes 102, 104, 106, 108, 110, and 112. Although the above has been shown using a selected group of processes for the method 100 for presenting a plurality of data points, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

According to some embodiments, at the process 102, a presentation system is configured to access a first dataset from a first data source. The system may include one or more memories having instructions stored thereon, and one or more processors configured to execute the instructions and perform operations. The first dataset may include a first text stream. In some embodiments, a first data point corresponds to a portion of the first text stream.

The dataset may be associated with an investigation. In some embodiments, the investigation may be related to law enforcement (e.g., drug transfers, money laundering, wire fraud, identity theft, etc.), although other types of investigation (e.g., employment issues) or other non-investigation are also contemplated. In some embodiments, the dataset may be associated with business intelligence (e.g., reports, summaries, dashboards, graphs, and charts related to a company and/or its performance). In some embodiments, the dataset may be associated with market intelligence (e.g., competitor products and behaviors, industry trends, consumer/customer behaviors, and market opportunities).

The dataset may be retrieved from one or more databases including tables of information stored in any suitable manner, storage locations of data, or storage locations within the present system. Any type of accessible storage architecture is contemplated by the present disclosure.

According to certain embodiments, at process 104, the presentation system is configured to extract a plurality of data points from the first dataset. In some embodiments, a dataset includes data for a plurality of data points connected to or associated with each other. The plurality of data points may correspond to different portions of a text stream (e.g., a text stream in a report). The first data point may correspond to one or more first set of objects.

According to some embodiments, at process 106, for a first data point of the plurality of data points, the system is configured to determine a first degree of interest for a first data point with respect to a center of interest on a first data layer of a plurality of data layers. The center of interest may include an object of interest (e.g., an investigation object). In some embodiments, determining a first degree of interest for the first data point includes determining the first degree of interest based upon the one or more first set of objects (e.g., one or more persons, one or more things, one or more places, etc.).

In some embodiments, the first data layer of a plurality of data layers may be categories (e.g., categories of objects). A first degree of interest for the first data point may be determined based on the category of each of the one or more first set of objects. In the context of an investigation, for example, each data point of the plurality of data points may be categorized into three categories (e.g., people, places, things). In some embodiments, each data point is associated with a core object in the set of objects corresponding to the data point. In certain embodiments, for information or data associated with investigations, the presentation system can use three categories, for example, people, places, and things. In some embodiments, the data points extracted from an investigation dataset (e.g., from an investigation report) are associated with one or more of the three categories.

According to certain embodiments, the object of interest may be selected by a user (e.g., investigator, detective, a policeman, a doctor, etc.) from the one or more first set of objects extracted from the first dataset. In some embodiments, the object of interest may be randomly or arbitrarily selected by a user. In some embodiments, one or more objects in the first set of objects may be connected to (e.g., associated with) the object of interest in a certain way, and the object of interest may be determined by the system based on the number of connections each of the objects has with other objects in the first set of objects. For example, the system may determine and select an object from the one or more first set of objects that has the most connections with other objects in the one or more first set of objects.

According to some embodiments, at process 108, the system is configured to determine a second degree of interest for the first data point on a second data layer of the plurality of data layers. As mentioned above, one or more objects in the first set of objects may be connected to (e.g., associated with) the object of interest in a certain way. As such, the system may be configured to infer one or more classified relationships between the one or more first set of objects and the object of interest. In some embodiments, the determining a second degree of interest for the first data point may include determining the second degree of interest based on the one or more inferred classified relationships.

In some embodiments, the second data layer of the plurality of data layers may be classification. In certain embodiments, a second degree of interest for the first data point may be determined based on the classification (e.g., classified relationship between a data point and the object of interest, inferred classified relationship between an object and the object of interest) of each of the one or more first set of objects. In some instances, objects may be divided into two classifications including relevant and irrelevant. In some instances, objects may be divided into three classifications including pertinent, non-pertinent, and unknown. In some instances, objects may be divided into more than three classifications with assigned confidence scores based on how strong their connection is with the object of interest.

According to certain embodiments, at process 110, the system is configured to aggregate the first degree of interest for the first data point and the second degree of interest for the first data point to determine a first aggregated degree of interest. The first aggregated degree of interest may be determined on both the first and second data layer of the plurality of data layers.

According to some embodiments, at process 112, the system is configured to present a representation of the first data point based upon the first aggregated degree of interest on a data diagram, the data diagram including a representation of the center of interest and one or more representations of one or more data points of the plurality of data points. In some embodiments, the data diagram may include a first dimension representing the first data layer of the plurality of data layers and a second dimension representing the second data layer of the plurality of data layers. In some instances, the first dimension is different from the second dimension. In an exemplary embodiment, the first dimension may be represented by a sector area of a base circle, and the second dimension may be represented by a ring area of the base circle.

Figure 2:
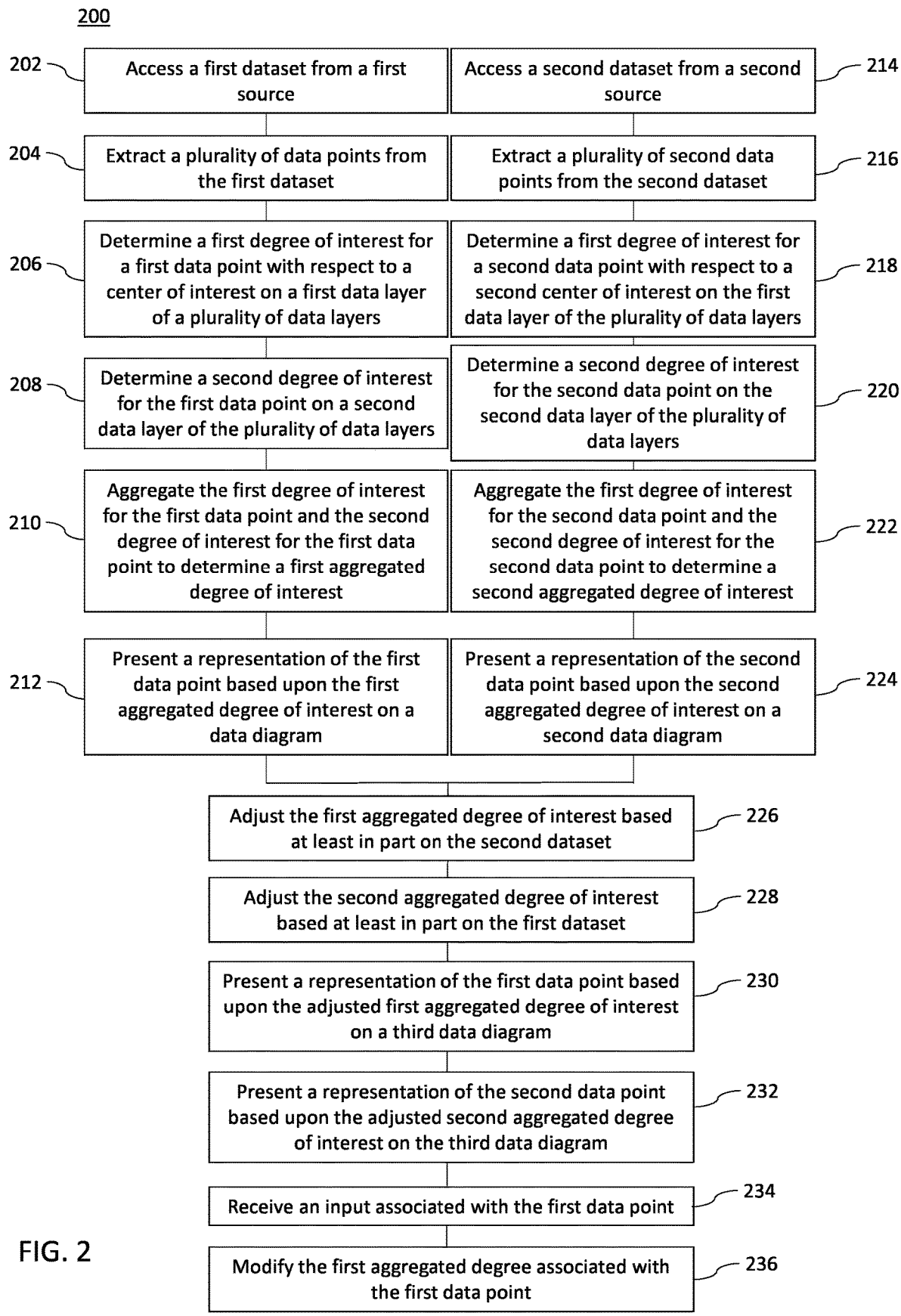
FIG. 2 depicts an illustrative flow diagram showing a method for presenting a plurality of data points, in accordance with certain embodiments of the present disclosure.

FIG. 2 depicts an illustrative flow diagram showing a method 200 for presenting a plurality of data points, in accordance with certain embodiments of the present disclosure. This diagram is merely an example. One of ordinary skill in the art would recognize many variations, alternatives, and modifications. The method 200 for presenting a plurality of data points includes processes 202, 204, 206, 208, 210, and 212. Although the above has been shown using a selected group of processes for the method 200 for presenting a plurality of data points, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

According to certain embodiments, at process 202, a presentation system is configured to access a first dataset from a first data source. At process 204, the system is configured to extract a plurality of data points from the first dataset. At process 206, for a first data point of the plurality of data points, the system is configured to determine a first degree of interest for a first data point with respect to a center of interest on a first data layer of a plurality of data layers. At process 208, the system is configured to determine a second degree of interest for the first data point on a second data layer of the plurality of data layers. At process 210, the system is configured to aggregate the first degree of interest for the first data point and the second degree of interest for the first data point to determine a first aggregated degree of interest. At process 212, the system is configured to present a representation of the first data point based upon the first aggregated degree of interest on a data diagram, the data diagram including a representation of the center of interest and one or more representations of one or more data points of the plurality of data points.

In certain embodiments, at process 214, the system is configured to access a second dataset. In some instances, the second dataset may be from the same source as the first dataset. In some instances, the second dataset may be from a second source that is different from the first source. The system may include one or more memories having instructions stored thereon, and one or more processors configured to execute the instructions and perform operations. The second dataset may include a second text stream. In some embodiments, a second data point corresponds to a portion of the second text stream. In some instances, the second text stream may be from the first dataset. In some instances, the second text stream may be from as second dataset different from the first dataset.

The second dataset may be associated with an investigation. In some embodiments, the investigation may be related to law enforcement (e.g., drug transfers, money laundering, wire fraud, identity theft, etc.), although other types of investigation (e.g., employment issues) or other non-investigation are also contemplated. In some embodiments, the second dataset may be associated with business intelligence (e.g., reports, summaries, dashboards, graphs, and charts related to a company and/or its performance). In some embodiments, the second dataset may be associated with market intelligence (e.g., competitor products and behaviors, industry trends, consumer/customer behaviors, and market opportunities).

The second dataset may be from one or more databases including tables of information stored in any suitable manner, storage locations of data, or storage locations within the present system. Any type of accessible storage architecture is contemplated by the present disclosure.

According to certain embodiments, at process 216, the system is configured to extract a plurality of second data points from the second dataset. The plurality of second data points may correspond to different portions of a second text stream. The first data point may correspond to one or more second set of objects.

In some instances, at process 218, for a second data point of the plurality of second data points, the system is configured to determine a first degree of interest for the second data point with respect to a second center of interest on the first data layer of the plurality of data layers. The second center of interest may include a second object of interest. In some embodiments, determining a first degree of interest for the second data point includes determining the first degree of interest based upon the one or more second set of objects.

In some embodiments, the first data layer of a plurality of data layers may be categories. A first degree of interest for the second data point may be determined based on the category of each of the one or more second set of objects. In the context of investigation, for example, each object of the one or more second set of objects may be categorized into three categories (e.g., people, places, things).

The second object of interest may be selected by a user (e.g., investigator, detective, etc.) from the one or more second set of objects. In some embodiments, the second object of interest may be randomly or arbitrarily selected by a user. In some embodiments, one or more objects in the second set of objects may be connected to the second object of interest in a certain way, and the second object of interest may be determined by the system based on the number of connections each object has with other objects in the second set of objects. For example, the system may determine and select an object from the one or more second set of objects that has the most connections with other objects in the second set of objects. In some embodiments, the second object of interest is different from the first object of interest. In some embodiments, when the second dataset is from a second source (e.g., a second report, a report from a second reporter, a report from a second investigator, etc.) different from the first source (e.g., a first report, a report from a first reporter, a report from a first investigator, etc.), the second object of interest may be the same as the first object of interest.

In certain embodiments, at process 220, the system is configured to determine a second degree of interest for the second data point on the second data layer of the plurality of data layers. In some embodiments, the system may be configured to infer one or more classified relationships between the one or more second set of objects and the second object of interest. In some embodiments, the determining a second degree of interest for the second data point may include determining the second degree of interest based on the one or more inferred classified relationships between the one or more second set of objects and the second object of interest.

In some embodiments, the second data layer of the plurality of data layers may be classification. A second degree of interest for the second data point may be determined based on the classification (e.g., inferred classified relationship between an object in the second data point and the second object of interest) of each of the one or more second set of objects. In some instances, objects may be divided into two classifications including relevant and irrelevant. In some instances, objects may be divided into three classifications including pertinent, non-pertinent, and unknown. In some instances, objects may be divided into more than three classifications by being assigned a confidence score based on how strong their connection is with the second object of interest.

According to certain embodiments, at process 222, the system is configured to aggregate the first degree of interest for the second data point and the second degree of interest for the second data point to determine a second aggregated degree of interest. The second aggregated degree of interest may be determined on both the first and second data layer of the plurality of data layers.

According to some embodiments, at process 224, the system is configured to present a representation of the second data point based upon the second aggregated degree of interest on a second data diagram, the second data diagram including a representation of the second center of interest and one or more representations of one or more second data points of the plurality of second data points. In some embodiments, the second data diagram may include a first dimension representing the first data layer of the plurality of data layers and a second dimension representing the second data layer of the plurality of data layers. In some instances, the first dimension is different from the second dimension. In an exemplary embodiment, the first dimension may be represented by a sector area of a base circle, and the second dimension may be represented by a ring area of the base circle.

According to certain embodiments, at process 226, the system is configured to adjust the first aggregated degree of interest based at least in part on the second dataset. At process 228, the system is configured to adjust the second aggregated degree of interest based at least in part on the first dataset. In some embodiments, the one or more second set of objects may include an overlapping object that is a same object as one object in the one or more first set of objects. The adjusting the first and second aggregated degrees of interest may be with respect to a third center of interest including a third object of interest. In some instances, the third object of interest may be selected from the object of interest from the first data point and the second object of interest from the second data point. In some instances, the third object of interest may be selected from the one or more first set of objects or the one or more second set of objects.

One or more objects from the first set of objects may be connected to the first object of interest in a first way. One or more objects from the second set of objects may be connected to the second object of interest in a second way. In some embodiments, an overlapping object may be connected to the first object of interest in a first way and to the second object in a second way different from the first way. As such, the system may be configured to infer an updated classified relationship between the overlapping object and the third object of interest. The adjusting the second aggregated degree of interest may include adjusting the second aggregated degree of interest based on the updated classified relationship between the overlapping object and the third object of interest.

According to some embodiments, at process 230, the system is configured to present a representation of the first data point based upon the adjusted first aggregated degree of interest on a third data diagram. At process 232, the system is configured to present a representation of the second data point based upon the adjusted second aggregated degree of interest on the third data diagram. The third data diagram may include a representation of the third center of interest and one or more representations of one or more data points of the plurality of data points from the first dataset and one or more representations of one or more second datapoints of the plurality of second data points from the second dataset. In some embodiments, the third data diagram may include a first dimension representing the first data layer of the plurality of data layers and a second dimension representing the second data layer of the plurality of data layers. In some instances, the first dimension is different from the second dimension. In an exemplary embodiment, the first dimension may be represented by a sector area of a base circle, and the second dimension may be represented by a ring area of the base circle.

At process 234, the system may be configured to receive an input associated with the first data point. At process 236, the system may be configured to modify the first or second aggregated degree of interest associated with the first data point. In some instances, the input may be from a user. In some instances, the input may be from a software interface. In some embodiments, for example, the input may be an addition of an object to the one or more set of objects in the first data point, thus affecting the first aggregated degree of interest. In yet some instances, the input may be a change in the classified relationship between one or more of the first set of objects and the object of interest, thus affecting the inferred classified relationships between the one or more second set of objects and the second object of interest, thus affecting the second aggregated degree of interest.

Figure 3:
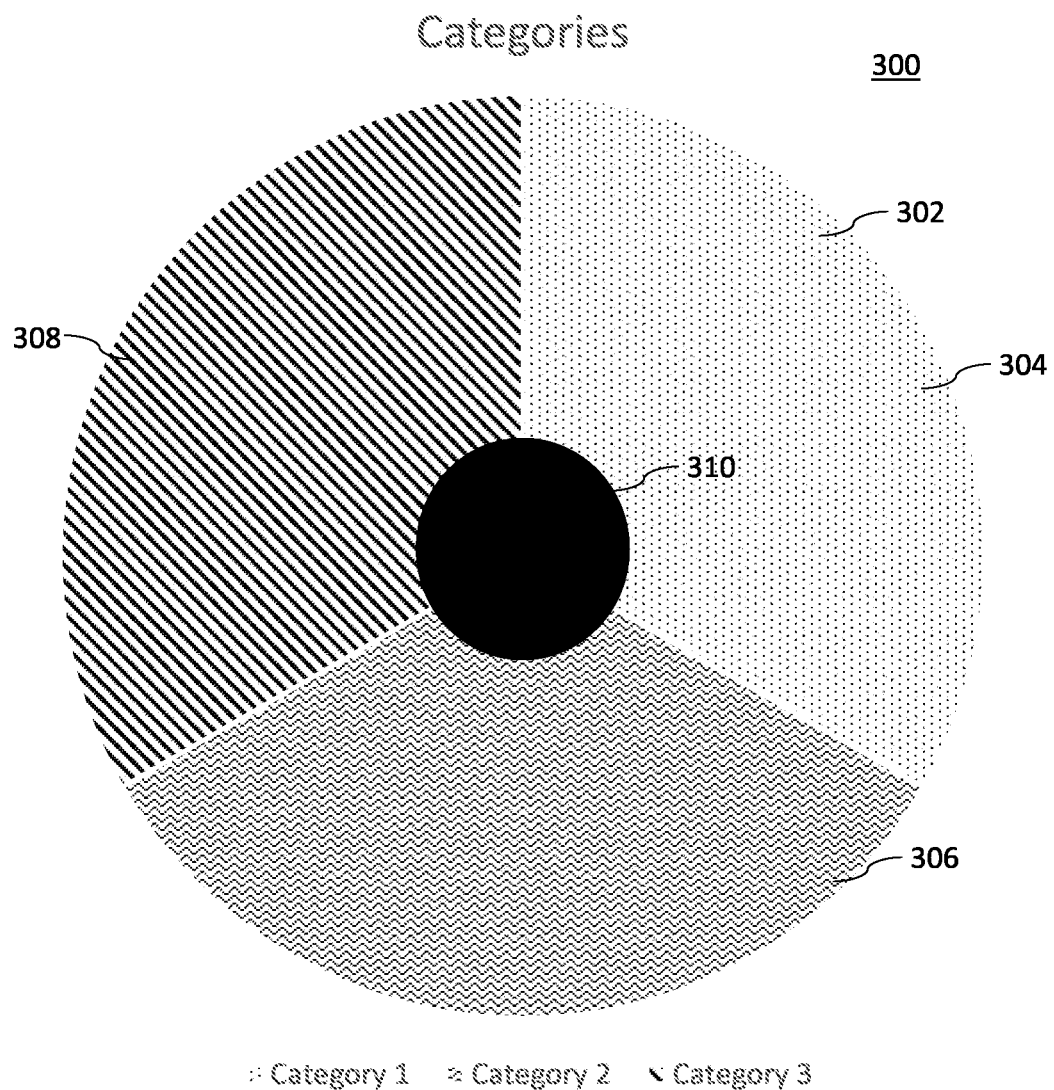
FIG. 3 depicts an illustrative data diagram having a dimension representing a data layer, in accordance with certain embodiments of the present disclosure.

FIG. 3 depicts an illustrative data diagram 300 having a dimension representing a data layer (e.g., a first data layer), in accordance with certain embodiments of the present disclosure. FIG. 3 is merely an example. One of the ordinary skilled in the art would recognize many variations, alternatives, and modifications. As shown, the data diagram 300 includes a representation of a first data layer on a first dimension. In some embodiments, the first dimension is configured to represent the first data layer using sector areas of a base circle. The first data layer may include a plurality of categories corresponding to a plurality of sector areas on a base circle.

In some embodiments, for example as shown, the first data layer may include category 1, category 2, and category 3 corresponding to sector area 304, 306, and 308 on the base circle 302. In some instances, categories 1, 2, and 3 may be people, places, and things, respectively. In some instances, the first data layer may include only two categories, each category corresponding to half the area of a base circle (not shown). In yet some instances, the first data layer may include more than three categories. The first data layer may also include a center of interest 310 located in the center of the base circle 302. The center of interest 310 may include an object of interest from a data point.

Figure 4:
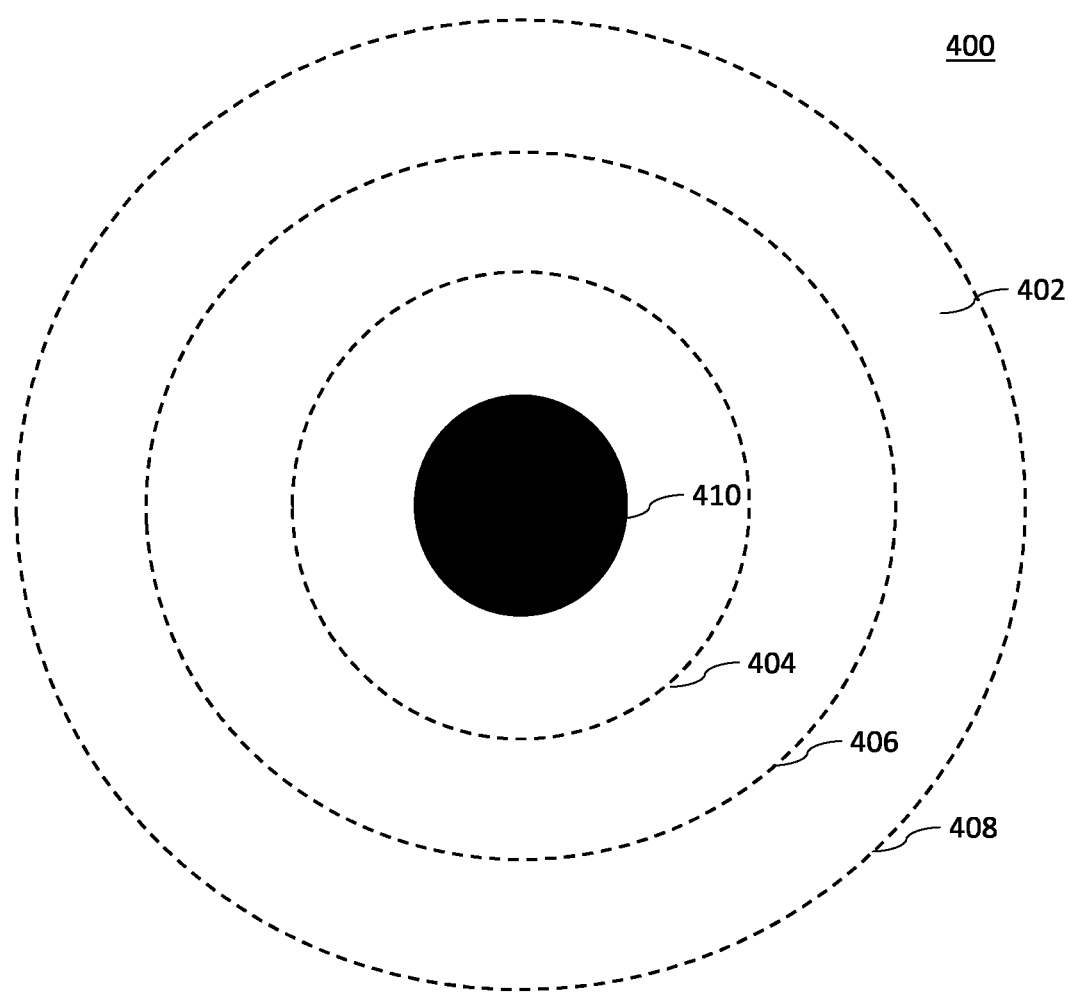
FIG. 4 depicts an illustrative data diagram having a dimension representing a data layer, in accordance with certain embodiments of the present disclosure.

FIG. 4 depicts an illustrative data diagram 400 having a dimension representing a data layer (e.g., a second data layer), in accordance with certain embodiments of the present disclosure. FIG. 4 is merely an example. One of the ordinary skilled in the art would recognize many variations, alternatives, and modifications. As shown, the data diagram 400 includes a representation of a second data layer on a second dimension. In some embodiments, the second dimension is configured to represent the data layer using ring areas of the base circle. The second data layer may include a plurality of classifications corresponding to a plurality of inferred classified relationships between each object from a data point and an object of interest from that data point.

In some embodiments, for example as shown, the second data layer may include three classifications corresponding to ring area 404, 406, and 408. Ring area 404 may represent objects that are pertinent to the object of interest. Ring area 406 may represent objects that are non-pertinent to the object of interest. Ring area 408 may represent objects that have unknown classified relationships with the object of interest (i.e. the closeness between objects in ring area 408 and the object of interest is unknown). In some instances, the second data layer may include only two classifications, represented by two ring areas. In yet some instances, the second data layer may include more than three classifications, and each classification may be assigned a confidence score based on the proximity or relevancy between the object and object of interest. The second data layer may also include a center of interest 410 located in the center of the base circle 402. The center of interest 410 may include an object of interest from a data point. In certain embodiments, the classified relationships between objects and the object of interest are illustrated in a data diagram as proximity corresponding to data points representing the objects. In some examples, the classified relationships are illustrated in a data diagram as the different ring areas with different proximities to the object of interest at the center of interest 410.

Figure 5:
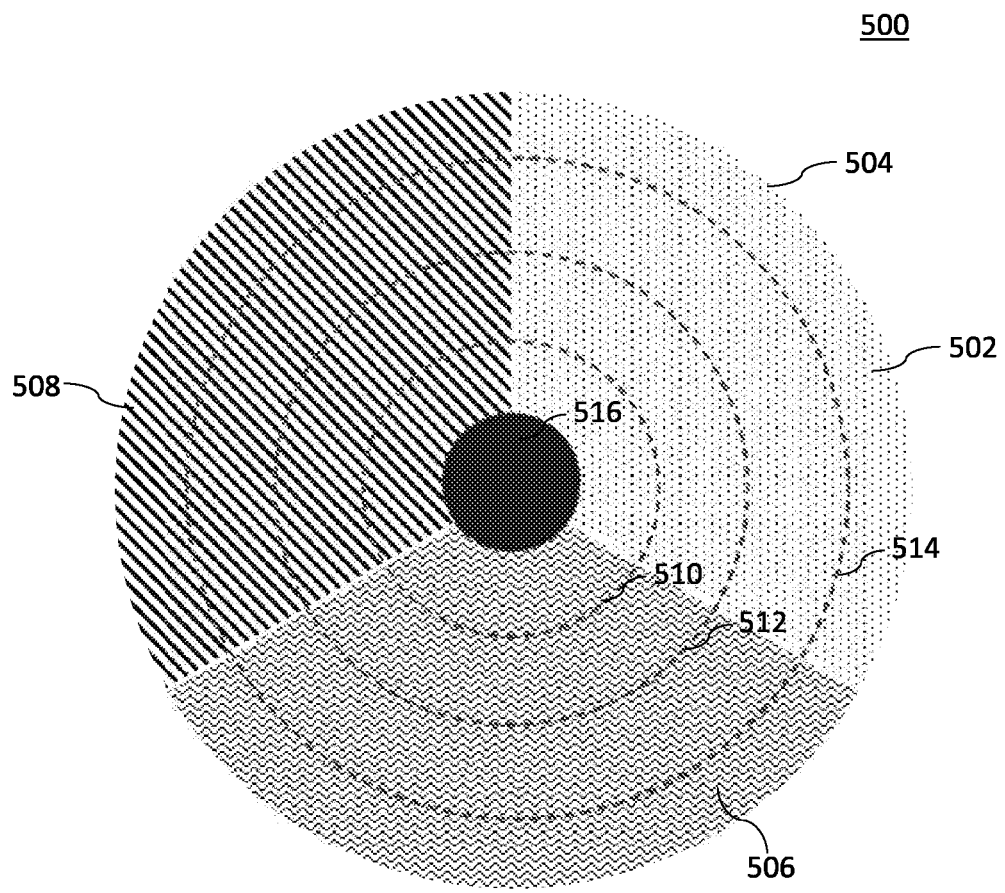
FIG. 5 depicts an illustrative data diagram having a first dimension representing a first data layer and a second dimension representing a second data layer, in accordance with certain embodiments of the present disclosure.

FIG. 5 depicts an illustrative data diagram 500 having a first dimension representing a first data layer and a second dimension representing a second data layer, in accordance with certain embodiments of the present disclosure. FIG. 5 is merely an example. One of the ordinary skilled in the art would recognize many variations, alternatives, and modifications. As shown, the first and second dimension are both represented on a base circle 502. The first data layer includes sector areas 504, 506, and 508 of the base circle 502. The second data layer includes ring areas 510, 512, and 514 of the base circle 502. The first and second data layers may also include a center of interest 516, for example, representing an object of interest, located in the center of the base circle 502.

Figure 6:
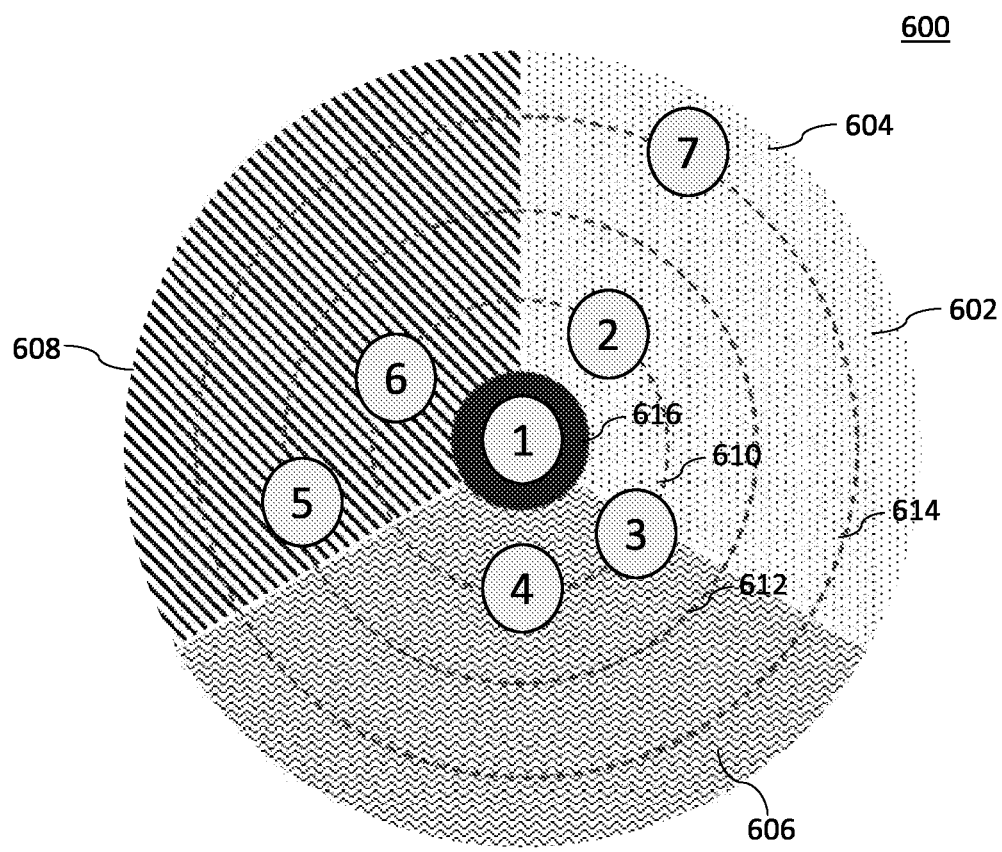
FIG. 6 depicts an illustrative data diagram having a representation of a data point having an aggregated degree of interest including a first degree of interest on a first data layer and a second degree of interest on a second data layer, in accordance with certain embodiments of the present disclosure.

FIG. 6 depicts an illustrative data diagram 600 having a representation of a plurality of first data points, each first data point having an aggregated degree of interest including a first degree of interest on a first data layer and a second degree of interest on a second data layer, in accordance with certain embodiments of the present disclosure. FIG. 6 is merely an example. One of the ordinary skilled in the art would recognize many variations, alternatives, and modifications. As shown, the data diagram 600 includes a first and second dimension represented on a base circle 602. The first data layer includes sector areas 604, 606, and 608 of the base circle 602. The second data layer includes ring areas 610, 612, and 614 of the base circle 602. The first and second data layers may also include a center of interest 616 located in the center of the base circle 602.

According to some embodiments, the presentation system is configured to access, from a first source, a first dataset and extracting a plurality of data points from the first dataset including a first data point. In some instances, the first data point includes one or more first set of objects. In some embodiments, for example as shown, a dataset has seven data points including data points 1, 2, 3, 4, 5, 6, and 7. In certain embodiments, a data point is associated with a core object (e.g., a subject such as a person).

For a first data point of the plurality of data points, the presentation system is configured to determine a first degree of interest for the first data point with respect to a center of interest 616 on a first data layer of a plurality of data layers, the first degree of interest represented by sector areas 604, 606, and 608 of the base circle 602, each representing a different category. The center of interest 616 may include an object of interest "data point 1". Data point 1 may be selected by user as an object of interest for investigation purpose. In an exemplary embodiment, the three categories may be people, things, and places. The first degree of interest may be determined based on the category of each object in the first data point. For example, data points 2 and 7 may include people that are placed in sector area 604 representing the people category, data points 3 and 4 may include things and thus placed in sector area 606 representing the things category, and data points 5 and 6 may be addresses placed in sector area 608 representing the places category.

In some embodiments, the presentation is configured to determine a second degree of interest for the first data point on a second data layer of the plurality of data layers, the second degree of interest represented by ring areas 610, 612, and 614 of the base circle 602, each representing a different classification. In an exemplary embodiment, the three classifications may be pertinent, non-pertinent, and unknown. The second degree of interest may be determined based on the classified relationship between each object in the first data point and the object of interest (data point 1). For example, data points 2, 3, 4, and 6 may be pertinent to data point 1. In an example where data point 1 includes a person, data point 2 may include a person of close classified relationship with data point 1, data points 3 and 4 may include things that belong to the person in data point 1, and data point 6 may include a place where the person in data point 1 lives.

According to certain embodiments, the presentation system is configured to aggregate the first degree of interest for the first data point and the second degree of interest for the first data point to determine a first aggregated degree of interest, and presenting a representation of the first data point based upon the first aggregated degree of interest on the data diagram 600 with a representation of the center of interest 616 in the middle of the base circle 602. The first aggregated degree of interest may be shown by an overlap of the sector areas 604, 606, and 608 and the ring areas 610, 612, and 614 of the base circle 602, and a placement of each object from the first data point on the base circle 602.

Figure 7:
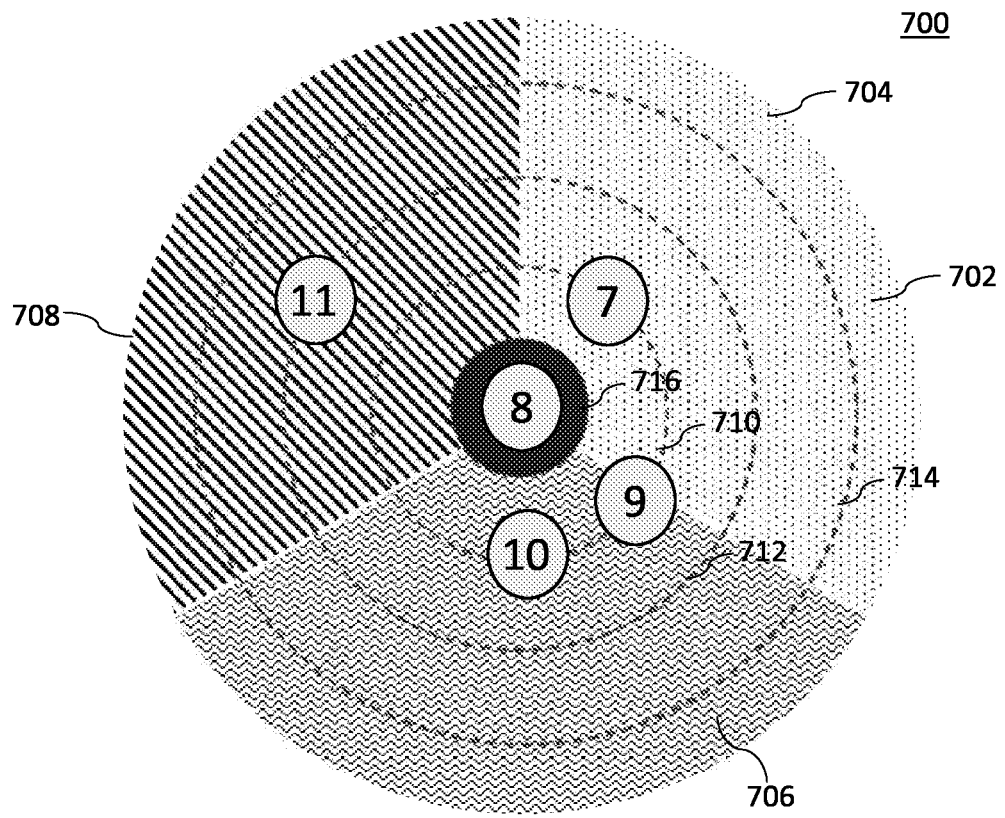
FIG. 7 depicts an illustrative data diagram having a representation of a data point having an aggregated degree of interest including a first degree of interest on a first data layer and a second degree of interest on a second data layer, in accordance with certain embodiments of the present disclosure.

FIG. 7 depicts an illustrative data diagram 700 having a representation of a plurality of second data points, where each second data point having an aggregated degree of interest including a first degree of interest on a first data layer and a second degree of interest on a second data layer, in accordance with certain embodiments of the present disclosure. FIG. 7 is merely an example. One of the ordinary skilled in the art would recognize many variations, alternatives, and modifications. The data diagram 700 may include a first and second dimension represented on a base circle 702. The first data layer includes sector areas 704, 706, and 708 of the base circle 702. The second data layer includes ring areas 710, 712, and 714 of the base circle 702. The first and second data layers may also include a center of interest 716 located in the center of the base circle 702.

As shown, the second dataset has five data points including data point 7, 8, 9, 10, and 11. The center of interest 716 includes an object of interest "object 8". In an exemplary embodiment, the first data layer is categories including people, things, and places, and the second data layer is classifications including pertinent, non-pertinent, and unknown. As such, object 7 is a person pertinent to object 8, objects 9 and 10 are things pertinent to object 8, and data point 11 is a place non-pertinent to object 8.

Figure 8:
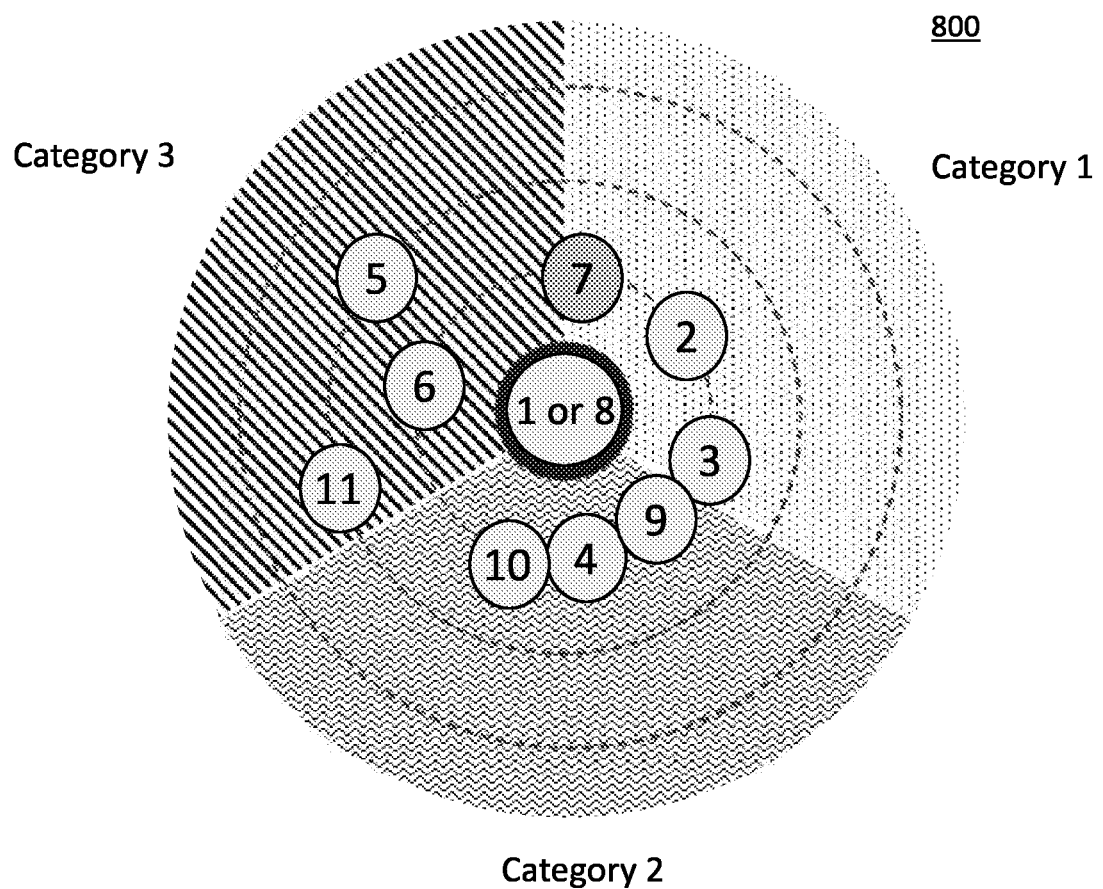
FIG. 8 depicts an illustrative data diagram having a representation of a first data point having an adjusted first aggregated degree of interest and a second data point having an adjusted second aggregated degree of interest, according to certain embodiments of the present disclosure.

FIG. 8 depicts an illustrative data diagram 800 having a merged representation for the data diagram 600 illustrated in FIG. 6 and the data diagram 700 illustrated in FIG. 7, according to certain embodiments of the present disclosure. FIG. 8 is merely an example. One of the ordinary skilled in the art would recognize many variations, alternatives, and modifications. In some embodiments, the presentation system is configured to adjust a first aggregated degree of interest of a first data point from a first dataset based at least in part on a second dataset, and adjusting a second aggregated degree of interest of a second data point from a second dataset based at least in part on the first dataset, the first aggregated degree of interest including a first degree of interest and a second degree of interest of the first data point, and the second aggregated degree of interest including a first degree of interest and a second degree of interest of the second data point.

In some embodiments, the one or more second set of objects may include an overlapping object that is a same object as one object in the one or more first set of objects. In an exemplary embodiment, a first data point includes objects 1 to 7, and a second data point includes objects 7 to 11. Therefore, the first data point and the second data point have an overlapping object 7. The adjusting the first and second aggregated degrees of interest may be with respect to a third center of interest including a third object of interest.

In some instances, the third object of interest may be selected from the object of interest from the first data point and the second object of interest from the second data point. For example, if the object of interest from the first data point is data point 1, and the object of interest from the second data point is object 8, the third object of interest in the third data diagram 800 may be either data point 1 or 8.

In some instances, an overlapping object may be connected to the first object of interest in a first way and to the second object in a second way different from the first way. For example, object 7 may have an unknown classified relationship with data point 1, but may be pertinent to object 8. The method may include inferring an updated classified relationship between the overlapping object (object 7) and the third object of interest (data point 1 or 8). The adjusting the second aggregated degree of interest may include adjusting the second aggregated degree of interest based on the updated classified relationship between the overlapping object and the third object of interest.

In some embodiments, the presentation system is configured to generate a representation of the first data point based upon the adjusted first aggregated degree of interest on the third data diagram 800, and presenting a representation of the second data point based upon the adjusted second aggregated degree of interest on the third data diagram 800. The third data diagram may include a representation of the third center of interest and one or more representations of one or more data points of the plurality of data points from the first dataset and one or more representations of one or more second datapoints of the plurality of second data points from the second dataset. In some embodiments, the third data diagram 800 may include a first dimension representing the first data layer of the plurality of data layers and a second dimension representing the second data layer of the plurality of data layers. In some instances, the first dimension is different from the second dimension. In an exemplary embodiment, the first dimension may be represented by a sector area of a base circle, and the second dimension may be represented by a ring area of the base circle.

Figure 9:
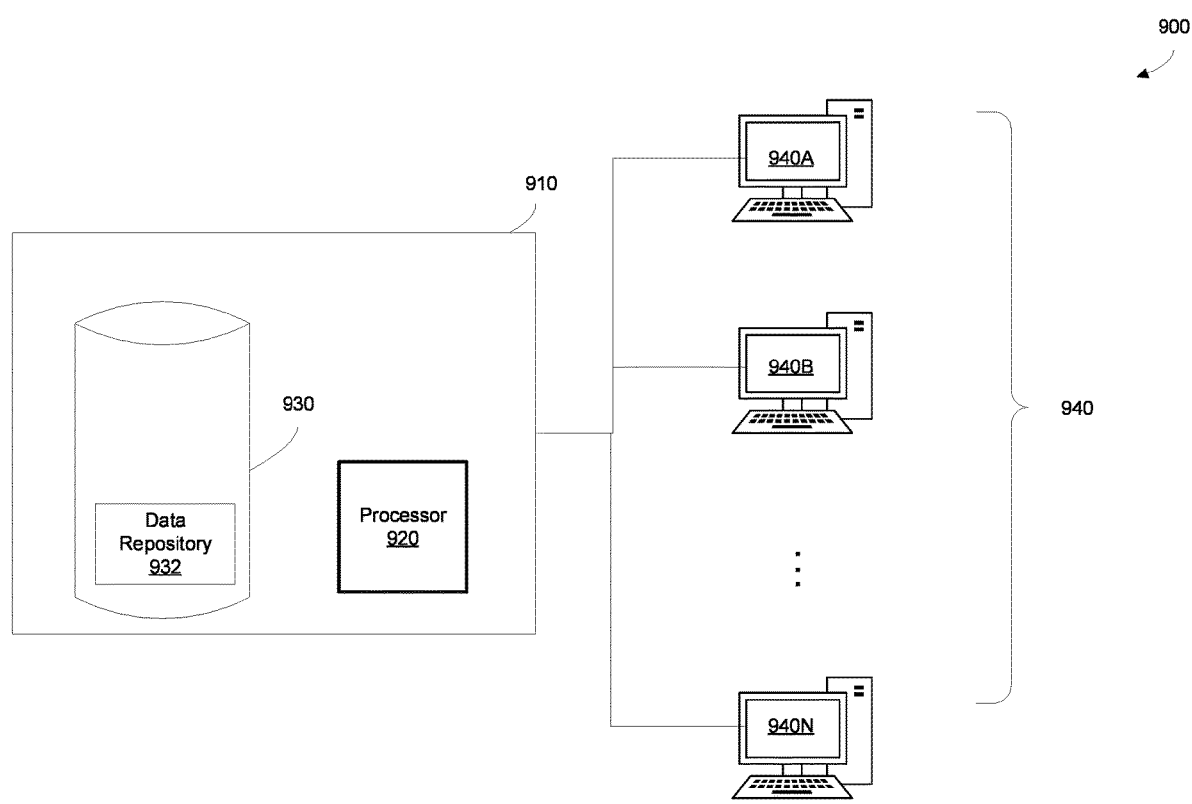
FIG. 9 depicts an illustrative example of a data presentation environment, according to certain embodiments of the present disclosure.

FIG. 9 is an illustrative example of a data presentation environment 900, according to certain embodiments of the present disclosure. FIG. 9 is merely an example. One of the ordinary skilled in the art would recognize many variations, alternatives, and modifications.

According to certain embodiments, the data presentation environment 900 includes a data presentation system 910 and one or more data sources 940 (e.g., data source 940A, data source 940B, . . . , data source 940N). According to some embodiments, the data presentation system 910 includes one or more processors 920 for data presentation and one or more memories 930, also referred to as a repository 930. In certain embodiments, the repository 930 includes one or more data repositories 932 for storing data (e.g., datasets, reports, classified relationships between objects, object relationships between objects, classifications, categories, etc.). In some embodiments, the data presentation system 910 is configured to receive a plurality of datasets from the one or more data sources 940. In certain embodiments, the data presentation system 910 or a portion (e.g., one or more components) of the data presentation system 910 can be integrated with the one or more data sources 940.

Although the above has been shown using a selected group of components in the data presentation environment 900, there can be many alternatives, modifications, and variations. For example, some of the components may be expanded and/or combined. Other components may be inserted into those noted above. Depending upon the embodiment, the arrangement of components may be interchanged with others replaced. Further details of these components are found throughout the present disclosure.

According to some embodiments, the data presentation system 910 and/or the one or more processors 920 is configured to access a first dataset from a first data source and extract a plurality of data points from the first dataset. According to certain embodiments, for a first data point of the plurality of data points, the data presentation system 910 is configured to determine a first degree of interest for a first data point with respect to a center of interest on a first data layer of a plurality of data layers. In some examples, the data presentation system 910 is configured to determine a second degree of interest for the first data point on a second data layer of the plurality of data layers. In certain examples, the data presentation system 910 is configured to aggregate the first degree of interest for the first data point and the second degree of interest for the first data point to determine a first aggregated degree of interest. In some examples, the data presentation system 910 is configured to present a representation of the first data point based upon the first aggregated degree of interest on a data diagram, the data diagram including a representation of the center of interest and one or more representations of one or more data points of the plurality of data points.

According to certain examples, the data presentation system 910 is configured to access a second dataset. In some instances, the second dataset may be from the same source as the first dataset. In certain instances, the second dataset may be from a second source that is different from the first source. The data presentation system 910 may include one or more memories 930 having instructions stored thereon, and one or more processors 920 configured to execute the instructions and perform operations. The second dataset may include a second text stream. In some embodiments, a second data point corresponds to a portion of the second text stream. In some instances, the second text stream may be from the first dataset. In certain examples, the second text stream may be from a second dataset different from the first dataset.

The second dataset may be associated with an investigation. In some embodiments, the investigation may be related to law enforcement (e.g., drug transfers, money laundering, wire fraud, identity theft, etc.), although other types of investigation (e.g., employment issues) or other non-investigation are also contemplated. In some embodiments, the second dataset may be associated with business intelligence (e.g., reports, summaries, dashboards, graphs, and charts related to a company and/or its performance). In certain embodiments, the second dataset may be associated with market intelligence (e.g., competitor products and behaviors, industry trends, consumer/customer behaviors, and market opportunities).

The second dataset may be from one or more databases including tables of information stored in any suitable manner, storage locations of data, or storage locations within the present system. Any type of accessible storage architecture is contemplated by the present disclosure.

According to some embodiments, the data presentation system 910 is configured to extract a plurality of second data points from the second dataset. The plurality of second data points may correspond to different portions of a second text stream. The first data point may correspond to one or more second set of objects.

In certain embodiments, for a second data point of the plurality of second data points, the data presentation system 910 is configured to determine a first degree of interest for the second data point with respect to a second center of interest on the first data layer of the plurality of data layers. The second center of interest may include a second object of interest. In some examples, determining a first degree of interest for the second data point includes determining the first degree of interest based upon the one or more second set of objects.

In certain examples, the first data layer of a plurality of data layers may be categories. A first degree of interest for the second data point may be determined based on the category of each of the one or more second set of objects. In the context of investigation, for example, each object of the one or more second set of objects may be categorized into three categories (e.g., people, places, things).

The second object of interest may be selected by a user (e.g., investigator, detective, etc.) from the one or more second set of objects. According to some embodiments, the second object of interest may be randomly or arbitrarily selected by a user. According to certain embodiments, one or more objects in the second set of objects may be connected to the second object of interest in a certain way, and the second object of interest may be determined by the data presentation system 910 based on the number of connections each object has with other objects in the second set of objects. For example, the data presentation system 910 may determine and select an object from the one or more second set of objects that has the most connections with other objects in the second set of objects. In some embodiments, the second object of interest is different from the first object of interest. In certain embodiments, when the second dataset is from a second source (e.g., a second report, a report from a second reporter, a report from a second investigator, etc.) different from the first source (e.g., a first report, a report from a first reporter, a report from a first investigator, etc.), the second object of interest may be the same as the first object of interest.

According to some embodiments, the data presentation system 910 is configured to determine a second degree of interest for the second data point on the second data layer of the plurality of data layers. In some embodiments, the data presentation system 910 may be configured to infer one or more classified relationships between the one or more second set of objects and the second object of interest. In certain embodiments, determining a second degree of interest for the second data point may include determining the second degree of interest based on the one or more inferred classified relationships between the one or more second set of objects and the second object of interest.

In some embodiments, the second data layer of the plurality of data layers may be classification. A second degree of interest for the second data point may be determined based on the classification (e.g., inferred classified relationship between an object in the second data point and the second object of interest) of each of the one or more second set of objects. In some instances, objects may be divided into two classifications including relevant and irrelevant. In some instances, objects may be divided into three classifications including pertinent, non-pertinent, and unknown. In some instances, objects may be divided into more than three classifications by being assigned a confidence score based on how strong their connection is with the second object of interest.

According to certain embodiments, the data presentation system 910 is configured to aggregate the first degree of interest for the second data point and the second degree of interest for the second data point to determine a second aggregated degree of interest. The second aggregated degree of interest may be determined on both the first and second data layer of the plurality of data layers.

In certain embodiments, the data presentation system 910 is configured to present a representation of the second data point based upon the second aggregated degree of interest on a second data diagram, the second data diagram including a representation of the second center of interest and one or more representations of one or more second data points of the plurality of second data points. In some examples, the second data diagram may include a first dimension representing the first data layer of the plurality of data layers and a second dimension representing the second data layer of the plurality of data layers. In some instances, the first dimension is different from the second dimension. In an exemplary embodiment, the first dimension may be represented by a sector area of a base circle, and the second dimension may be represented by a ring area of the base circle.

In some examples, the data presentation system 910 is configured to adjust the first aggregated degree of interest based at least in part on the second dataset, and adjust the second aggregated degree of interest based at least in part on the first dataset. In certain examples, the one or more second set of objects may include an overlapping object that is a same object as one object in the one or more first set of objects. The adjusting the first and second aggregated degrees of interest may be with respect to a third center of interest including a third object of interest. In some instances, the third object of interest may be selected from the object of interest from the first data point and the second object of interest from the second data point. In certain instances, the third object of interest may be selected from the one or more first set of objects or the one or more second set of objects.

One or more objects from the first set of objects may be connected to the first object of interest in a first way. One or more objects from the second set of objects may be connected to the second object of interest in a second way. In some embodiments, an overlapping object may be connected to the first object of interest in a first way and to the second object in a second way different from the first way. As such, the data presentation system 910 may be configured to infer an updated classified relationship between the overlapping object and the third object of interest. The adjusting the second aggregated degree of interest may include adjusting the second aggregated degree of interest based on the updated classified relationship between the overlapping object and the third object of interest.

According to certain embodiments, the data presentation system 910 is configured to present a representation of the first data point based upon the adjusted first aggregated degree of interest on a third data diagram. In some embodiments, the data presentation system 910 is configured to present a representation of the second data point based upon the adjusted second aggregated degree of interest on the third data diagram. The third data diagram may include a representation of the third center of interest and one or more representations of one or more data points of the plurality of data points from the first dataset and one or more representations of one or more second datapoints of the plurality of second data points from the second dataset. In some instances, the third data diagram may include a first dimension representing the first data layer of the plurality of data layers and a second dimension representing the second data layer of the plurality of data layers. In some examples, the first dimension is different from the second dimension. In an exemplary embodiment, the first dimension may be represented by a sector area of a base circle, and the second dimension may be represented by a ring area of the base circle.

In certain embodiments, the data presentation system 910 may be configured to receive an input associated with the first data point and modify the first or second aggregated degree of interest associated with the first data point. In some instances, the input may be from a user. In some instances, the input may be from a software interface. In some embodiments, for example, the input may be addition of an object to the one or more set of objects in the first data point, thus affecting the first aggregated degree of interest. In yet some embodiments, the input may be a change in the classified relationship between one or more of the first set of objects and the object of interest, thus affecting the inferred classified relationships between the one or more second set of objects and the second object of interest, thus affecting the second aggregated degree of interest.

In some embodiments, the repository 930 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the data presentation environment 900 can execute software or firmware stored in non-transitory computer-readable medium to implement various processing steps. Various components and processors of the system 900 can be implemented by one or more computing devices including, but not limited to, circuits, a computer, a cloud-based processing unit, a processor, a processing unit, a microprocessor, a mobile computing device, and/or a tablet computer. In some cases, various components of the data presentation environment 900 (e.g., the data presentation system 910, one or more processors 920, one or more data sources 940) can be implemented on a shared computing device. Alternatively, a component of the data presentation environment 900 can be implemented on multiple computing devices. In some implementations, various modules and components of the system 900 can be implemented as software, hardware, firmware, or a combination thereof. In some cases, various components of the image scoring environment 400 can be implemented in software or firmware executed by a computing device.

Various components of the data presentation environment 900 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 10:
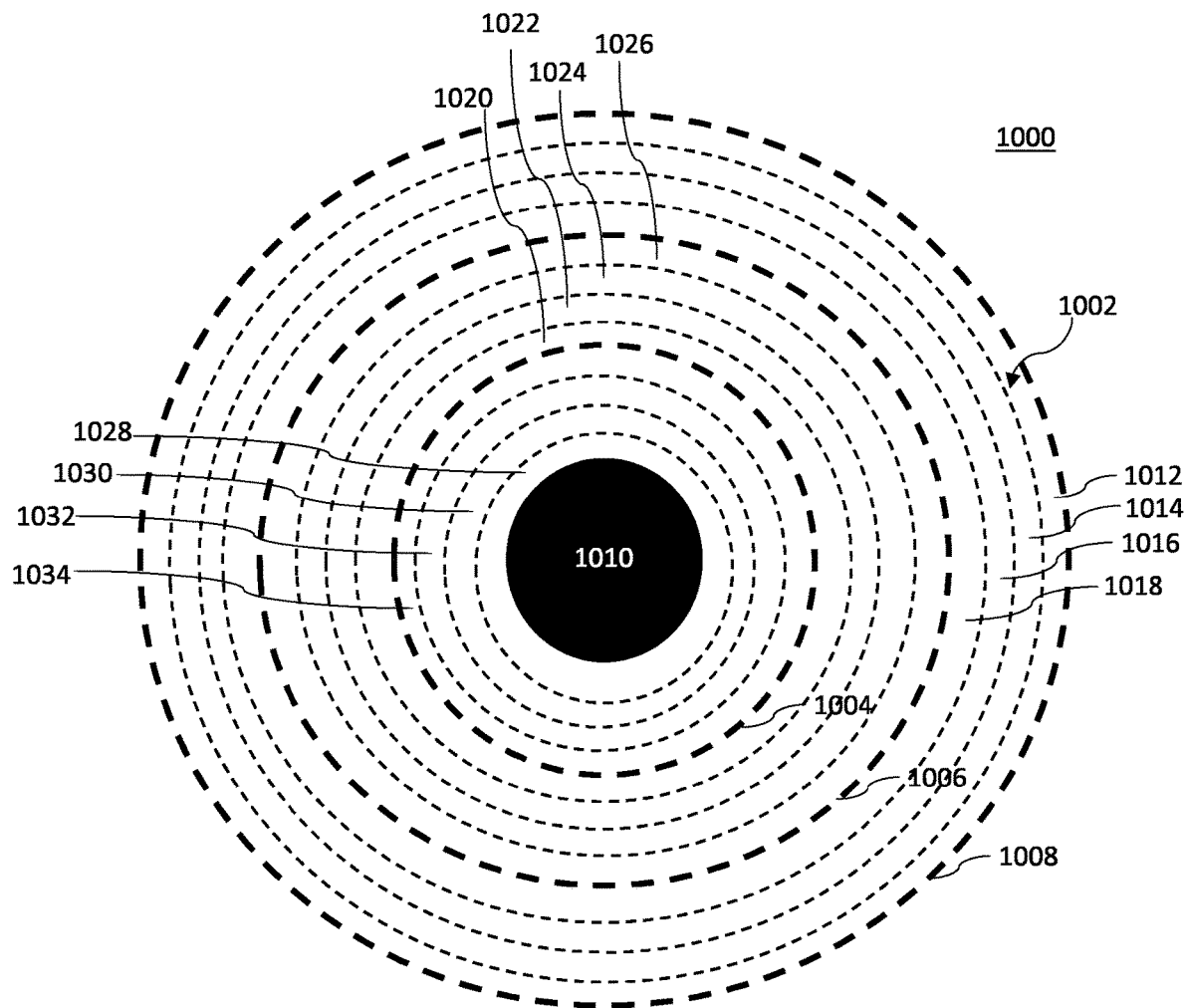
FIG. 10 depicts an illustrative data diagram having a dimension representing multiple data layers (e.g., a second and a third data layer), in accordance with certain embodiments of the present disclosure.

FIG. 10 depicts an illustrative data diagram 1000 having a dimension representing multiple data layers (e.g., a second and a third data layer), in accordance with certain embodiments of the present disclosure. FIG. 10 is merely an example. One of the ordinary skilled in the art would recognize many variations, alternatives, and modifications. As shown, the data diagram 1000 includes a representation of a second data layer on a second dimension. In some embodiments, the second dimension is configured to represent the data layer using bolded ring areas of the base circle 1002. The second data layer may include a plurality of classifications corresponding to a plurality of inferred classified relationships between each object from a data point and an object of interest from that data point.

In some embodiments, for example as shown, the second data layer may include three classifications corresponding to bolded ring area 1004, 1006, and 1008. Ring area 1004 may represent objects that are pertinent to an object of interest. Ring area 1006 may represent objects that are non-pertinent to an object of interest. Ring area 1008 may represent objects that have unknown classified relationships with the object of interest (i.e. the closeness between objects in ring area 1008 and the object of interest is unknown).

In some instances, the second data layer may include only two classifications, represented by two ring areas. In yet some instances, the second data layer may include more than three classifications, and each classification may be assigned a confidence score based on the proximity or relevancy between the object and object of interest.

The second data layer may also include a center of interest 1010 located in the center of the base circle 1002. The center of interest 1010 may include an object of interest from a data point. In certain embodiments, the classified relationships between objects and the object of interest are illustrated in a data diagram as proximity corresponding to data points representing the objects. In some examples, as shown, the classified relationships are illustrated in the data diagram 1000 as the different ring areas with different proximities to the object of interest at the center of interest 1010.

According to some embodiments, a data diagram may include more than two dimensions representing more than two data layers. In some embodiments, a third dimension includes a third data layer representing the object relationships between various objects and the object of interest, or amongst various objects. In certain embodiments, the third data layer includes four different object relationships between two objects that are both classified as people, the four different object relationships corresponding to ring areas 1012, 1014, 1016, and 1018. In some embodiments, the third data layer includes four additional different object relationships between two objects, one of which classified as a person and one of which classified as a thing, the four different object relationships corresponding to ring areas 1020, 1022, 1024, and 1026. In yet some embodiments, the third data layer includes four additional different object relationships between two objects, one of which classified as a person and one of which classified as a place, the four different object relationships corresponding to ring areas 1028, 1030, 1032, and 1034.

In some instances, an object relationship between two people may include family, friends, acquaintance, stranger, and/or unknown. In some instances, an object relationship between a person and a thing may include owned, borrowed, other, and/or unknown. In some instances, an object relationship between a person and a place may include owned, borrowed, other, and/or unknown.

According to a first embodiment ("Embodiment 1"), a system for presenting a plurality of data points includes, for example, one or more memories having instructions stored thereon, and one or more processors configured to execute the instructions and perform operations including accessing, from a first source, a first dataset and extracting a plurality of data points from the first dataset. For a first data point of the plurality of data points, the system is configured to determine a first degree of interest for the first data point with respect to a center of interest on a first data layer of a plurality of data layers, the center of interest representing an object of interest; determine a second degree of interest for the first data point on a second data layer of the plurality of data layers; and aggregate the first degree of interest for the first data point and the second degree of interest for the first data point to determine a first aggregated degree of interest.

Embodiment 2 is the system of Embodiment 1, wherein the operations further include presenting a representation of the first data point based upon the first aggregated degree of interest on a data diagram, the data diagram including a representation of the center of interest and one or more representations of one or more data points of the plurality of data points.

Embodiment 3 is the system of Embodiment 2, wherein the data diagram includes a first dimension representing the first data layer of the plurality of data layers; wherein the data diagram includes a second dimension representing the second data layer of the plurality of data layers; and wherein the first dimension is different from the second dimension.

Embodiment 4 is the system of any of Embodiments 1-3, wherein the first dimension is represented by a sector area of a base circle.

Embodiment 5 is the system of Embodiment 4, wherein the second dimension is represented by a ring area of the base circle.

Embodiment 6 is the system of any of Embodiments 1-5, wherein the first data point corresponds to one or more first set of objects; and wherein the determining a first degree of interest for the first data point includes determining the first degree of interest based upon the one or more first set of objects.

Embodiment 7 is the system of any of Embodiments 1-6, wherein the first dataset includes a first text stream, wherein the first data point corresponds to a portion of the first text stream.

Embodiment 8 is the system of Embodiments 6 or 7, wherein the operations further include inferring one or more classified relationships between the one or more first set of objects and the object of interest; and wherein the determining a second degree of interest for the first data point includes determining the second degree of interest based on the one or more inferred classified relationships.

Embodiment 9 is the system of any of Embodiments 1-8, wherein the operations further include accessing, from a second source different from the first source, a second dataset; and extracting a plurality of second data points from the second dataset. For a second data point of the plurality of second data points, the system is further configured to determine a first degree of interest for the second data point with respect to a second center of interest on a first data layer of a plurality of data layers, the second center of interest representing a second object of interest; determining a second degree of interest for the second data point on the second data layer of the plurality of data layers; and aggregating the first degree of interest for the second data point and the second degree of interest for the second data point to determine a second aggregated degree of interest.

Embodiment 10 is the system of Embodiment 9, wherein the operations further include presenting a representation of the second data point based upon the second aggregated degree of interest on a second data diagram, the second data diagram including a representation of the second center of interest and one or more representations of one or more second data points of the plurality of second data points.

Embodiment 11 is the system of Embodiment 10, wherein the operations further include adjusting the first aggregated degree of interest based at least in part on the second dataset; and adjusting the second aggregated degree of interest based at least in part on the first dataset.

Embodiment 12 is the system of Embodiment 11, wherein the operations further include presenting a representation of the first data point based upon the adjusted first aggregated degree of interest on a third data diagram; and presenting a representation of the second data point based upon the adjusted second aggregated degree of interest on the third data diagram.

Embodiment 13 is the system of any of Embodiments 1-12, wherein the operations further include receiving an input associated with the first data point; and modifying the first aggregated degree associated with the first data point.

Embodiment 14 is the system of Embodiment 13, wherein the input is from a user or a software interface.

Embodiment 15 is the system of any of Embodiments 9-14, wherein the second data point corresponds to one or more second set of objects; and wherein the determining a first degree of interest for the second data point includes determining the first degree of interest based upon the one or more second set of objects.

Embodiment 16 is the system of any of Embodiments 9-15, wherein the first dataset includes a second text stream, wherein the second data point corresponds to a portion of the second text stream.

Embodiment 17 is the system of Embodiments 15 or 16, wherein the operations further include inferring one or more classified relationships between the one or more second set of objects and the second object of interest based at least in part on the second dataset; wherein the determining a second degree of interest for the second data point includes determining the second degree of interest based on the one or more inferred classified relationships.

Embodiment 18 is the system of any of Embodiments 15 to 17, wherein the one or more second set of objects includes an overlapping object that is a same object as one object in the one or more first set of objects.

Embodiment 19 is the system of Embodiment 18, wherein the third data diagram includes a third center of interest representing a third object of interest.

Embodiment 20 is the system of Embodiment 19, wherein the operations further include inferring an updated classified relationship between the overlapping object and the third object of interest; wherein the adjusting the second aggregated degree of interest includes adjusting the second aggregated degree of interest based on the updated classified relationship.

Embodiment 21 is the system of Embodiments 19 or 20, wherein the third object of interest is selected from a group consisting of the object of interest and the second object of interest.

Embodiment 22 is a method of presenting a plurality of data points, the method implemented by a system including one or more processors and one or more memories, the method including accessing, from a first source, a first dataset; and extracting a plurality of data points from the first dataset. For a first data point of the plurality of data points, the method further includes determining a first degree of interest for the first data point with respect to a center of interest on a first data layer of a plurality of data layers, the center of interest including an object of interest; determining a second degree of interest for the first data point on a second data layer of the plurality of data layers; aggregating the first degree of interest for the first data point and the second degree of interest for the first data point to determine a first aggregated degree of interest; and presenting a representation of the first data point based upon the first aggregated degree of interest on a data diagram, the data diagram including a representation of the center of interest and one or more representations of one or more data points of the plurality of data points.

Embodiment 23 is the method of Embodiment 22, wherein the data diagram includes a first dimension representing the first data layer of the plurality of data layers; wherein the data diagram includes a second dimension representing the second data layer of the plurality of data layers; and wherein the first dimension is different from the second dimension.

Embodiment 24 is the method of Embodiments 22 or 23, wherein the first dimension is represented by a sector area of a base circle.

Embodiment 25 is the method of Embodiments 24, wherein the second dimension is represented by a ring area of the base circle.

Embodiment 26 is the method of any of Embodiments 22-25, wherein the first data point corresponds to one or more first set of objects; and wherein the determining a first degree of interest for the first data point includes determining the first degree of interest based upon the one or more first set of objects.

Embodiment 27 is the method of any of Embodiments 22-26, wherein the first dataset includes a first text stream, wherein the first data point corresponds to a portion of the first text stream.

Embodiment 28 is the method of Embodiments 26 or 27, further including inferring one or more classified relationships between the one or more first set of objects and the object of interest; and wherein the determining a second degree of interest for the first data point includes determining the second degree of interest based on the one or more inferred classified relationships.

Embodiment 29 is the method of any of Embodiments 22-28, further including accessing, from a second source different from the first source, a second dataset; and extracting a plurality of second data points from the second dataset. For a second data point of the plurality of second data points, the system is further configured to determine a first degree of interest for the second data point with respect to a second center of interest on a first data layer of a plurality of data layers, the second center of interest representing a second object of interest; determining a second degree of interest for the second data point on the second data layer of the plurality of data layers; and aggregating the first degree of interest for the second data point and the second degree of interest for the second data point to determine a second aggregated degree of interest.

Embodiment 30 is the method of Embodiment 29, further including presenting a representation of the second data point based upon the second aggregated degree of interest on a second data diagram, the second data diagram including a representation of the second center of interest and one or more representations of one or more second data points of the plurality of second data points.

Embodiment 31 is the method of Embodiment 30, further including adjusting the first aggregated degree of interest based at least in part on the second dataset; and adjusting the second aggregated degree of interest based at least in part on the first dataset.

Embodiment 32 is the method of Embodiment 31, further including presenting a representation of the first data point based upon the adjusted first aggregated degree of interest on a third data diagram; and presenting a representation of the second data point based upon the adjusted second aggregated degree of interest on the third data diagram.

Embodiment 33 is the method of any of Embodiments 22-32, further including receiving an input associated with the first data point; and modifying the first aggregated degree associated with the first data point.

Embodiment 34 is the method of Embodiments 33, wherein the input is from a user or a software interface.

Embodiment 35 is the method of any of Embodiments 29-34, wherein the second data point corresponds to one or more second set of objects; and wherein the determining a first degree of interest for the second data point includes determining the first degree of interest based upon the one or more second set of objects.

Embodiment 36 is the method of any of Embodiments 29-35, wherein the first dataset includes a second text stream, wherein the second data point corresponds to a portion of the second text stream.

Embodiment 37 is the method of Embodiments 35 or 36, wherein the operations further include inferring one or more classified relationships between the one or more second set of objects and the second object of interest based at least in part on the second dataset; wherein the determining a second degree of interest for the second data point includes determining the second degree of interest based on the one or more inferred classified relationships.

Embodiment 38 is the method of any of Embodiments 35-37, wherein the one or more second set of objects includes an overlapping object that is a same object as one object in the one or more first set of objects.

Embodiment 39 is the method of Embodiment 38, wherein the third data diagram includes a third center of interest representing a third object of interest.

Embodiment 40 is the method of Embodiment 39, further including inferring an updated classified relationship between the overlapping object and the third object of interest; wherein the adjusting the second aggregated degree of interest includes adjusting the second aggregated degree of interest based on the updated classified relationship.

Embodiment 41 is the method of Embodiments 39 or 40, wherein the third object of interest is selected from a group consisting of the object of interest and the second object of interest.

Embodiment 41 is the method of Embodiment 28, further including determining a third degree of interest for the first data point based upon the one or more first set of objects.

Embodiment 42 is the method of Embodiment 41, further including inferring one or more object relationships between the one or more first set of objects and the object of interest;

wherein determining the third degree of for the first data point includes determining the third degree of interest based on the one or more inferred object relationships.

Some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code including program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The classified relationship of client device and server arises by virtue of computer programs running on the respective computers and having a client device-server classified relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A system for presenting a plurality of data points, comprising:
one or more memories having instructions stored thereon; and
one or more processors configured to execute the instructions and perform operations comprising:
accessing, from a first source, a first dataset;
extracting a plurality of data points from the first dataset;
for a first data point of the plurality of data points:
determining a first degree of interest for the first data point with respect to a center of interest on a first data layer of a plurality of data layers, the center of interest representing an object of interest;
determining a second degree of interest for the first data point on a second data layer of the plurality of data layers; and
aggregating the first degree of interest for the first data point and the second degree of interest for the first data point to determine a first aggregated degree of interest, wherein the operations further comprise presenting a representation of the first data point based upon the first aggregated degree of interest on a data diagram, the data diagram including a representation of the center of interest and one or more representations of one or more data points of the plurality of data points.

2. The system of claim 1,
wherein the data diagram includes a first dimension representing the first data layer of the plurality of data layers;
wherein the data diagram includes a second dimension representing the second data layer of the plurality of data layers; and
wherein the first dimension is different from the second dimension.

3. The system of claim 2, wherein the first dimension is represented by a sector area of a base circle.

4. The system of claim 3, wherein the second dimension is represented by a ring area of the base circle.

5. The system of claim 1,
wherein the first data point corresponds to one or more first set of objects;
wherein the determining a first degree of interest for the first data point comprises determining the first degree of interest based upon the one or more first set of objects.

6. The system of claim 5, wherein the operations further comprise:
inferring one or more classified relationships between the one or more first set of objects and the object of interest;
wherein the determining a second degree of interest for the first data point comprises determining the second degree of interest based on the one or more inferred classified relationships.

7. The system of claim 1, wherein the first dataset comprises a first text stream, wherein the first data point corresponds to a portion of the first text stream.

8. The system of claim 1, wherein the operations further comprise:
accessing, from a second source different from the first source, a second dataset;
extracting a plurality of second data points from the second dataset;
for a second data point of the plurality of second data points:
determining a first degree of interest for the second data point with respect to a second center of interest on the first data layer of the plurality of data layers, the second center of interest representing a second object of interest;
determining a second degree of interest for the second data point on the second data layer of the plurality of data layers; and
aggregating the first degree of interest for the second data point and the second degree of interest for the second data point to determine a second aggregated degree of interest.

9. The system of claim 8, wherein the operations further comprise:
presenting a representation of the second data point based upon the second aggregated degree of interest on a second data diagram, the second data diagram including a representation of the second center of interest and one or more representations of one or more second data points of the plurality of second data points.

10. The system of claim 9, wherein the operations further comprise:
adjusting the first aggregated degree of interest based at least in part on the second dataset; and
adjusting the second aggregated degree of interest based at least in part on the first dataset.

11. The system of claim 10, wherein the operations further comprise:
presenting a representation of the first data point based upon the adjusted first aggregated degree of interest on a third data diagram; and
presenting a representation of the second data point based upon the adjusted second aggregated degree of interest on the third data diagram.

12. The system of claim 8,
wherein the second data point corresponds to one or more second set of objects;
wherein the determining a first degree of interest for the second data point comprises determining the first degree of interest based upon the one or more second set of objects.

13. The system of claim 12, wherein the operations further comprise:
inferring one or more classified relationships between the one or more second set of objects and the second object of interest based at least in part on the second dataset;
wherein the determining a second degree of interest for the second data point comprises determining the second degree of interest based on the one or more inferred classified relationships.

14. The system of claim 12, wherein the one or more second set of objects comprises an overlapping object that is a same object as one object in the one or more first set of objects.

15. The system of claim 14,
wherein the third data diagram includes a third center of interest representing a third object of interest.

16. The system of claim 15, wherein the operations further comprise:
inferring an updated classified relationship between the overlapping object and the third object of interest;
wherein the adjusting the second aggregated degree of interest comprises adjusting the second aggregated degree of interest based on the updated classified relationship.

17. The system of claim 15, wherein the third object of interest is selected from a group consisting of the object of interest and the second object of interest.

18. The system of claim 8, wherein the first dataset comprises a second text stream;
wherein the second data point corresponds to a portion of the second text stream.

19. The system of claim 1, wherein the operations further comprise:
receiving an input associated with the first data point;
modifying the first aggregated degree of interest associated with the first data point.

20. The system of claim 19, wherein the input is from a user or a software interface.

21. A method of presenting a plurality of data points, the method implemented by a system including one or more processors and one or more memories, the method comprising:
accessing, from a first source, a first dataset;
extracting a plurality of data points from the first dataset;
for a first data point of the plurality of data points:

determining a first degree of interest for the first data point with respect to a center of interest on a first data layer of a plurality of data layers, the center of interest comprising an object of interest;
determining a second degree of interest for the first data point on a second data layer of the plurality of data layers; and
aggregating the first degree of interest for the first data point and the second degree of interest for the first data point to determine a first aggregated degree of interest; and
presenting a representation of the first data point based upon the first aggregated degree of interest on a data diagram, the data diagram including a representation of the center of interest and one or more representations of one or more data points of the plurality of data points.

22. The method of claim 21,
wherein the data diagram includes a first dimension representing the first data layer of the plurality of data layers;
wherein the data diagram includes a second dimension representing the second data layer of the plurality of data layers;
wherein the first dimension is different from the second dimension;
wherein the first data point corresponds to one or more first set of objects;
wherein the determining a first degree of interest for the first data point comprises determining the first degree of interest based upon the one or more first set of objects;
wherein the first dataset comprises a first text stream, wherein the first data point corresponds to a portion of the first text stream.

23. The method of claim 22, further comprising:
inferring one or more classified relationships between the one or more first set of objects and the object of interest;
wherein the determining a second degree of interest for the first data point comprises determining the second degree of interest based on the one or more inferred classified relationships.

24. The method of claim 23, further comprising:
accessing, from a second source different from the first source, a second dataset;
extracting a plurality of second data points from the second dataset;
for a second data point of the plurality of second data points:
determining a first degree of interest for the second data point with respect to a second center of interest on the first data layer of the plurality of data layers, the second center of interest representing a second object of interest;
determining a second degree of interest for the second data point on the second data layer of the plurality of data layers; and
aggregating the first degree of interest for the second data point and the second degree of interest for the second data point to determine a second aggregated degree of interest; and
presenting a representation of the second data point based upon the second aggregated degree of interest on a second data diagram, the second data diagram including a representation of the second center of interest and one or more representations of one or more second data points of the plurality of second data points.

25. The method of claim 24, further comprising:
adjusting the first aggregated degree of interest based at least in part on the second dataset;
adjusting the second aggregated degree of interest based at least in part on the first dataset;
presenting a representation of the first data point based upon the adjusted first aggregated degree of interest on a third data diagram; and
presenting a representation of the second data point based upon the adjusted second aggregated degree of interest on the third data diagram.

26. The method of claim 25, further comprising:
receiving an input associated with the first data point;
modifying the first aggregated degree associated with the first data point;
wherein the second data point corresponds to one or more second set of objects;
wherein the determining a first degree of interest for the second data point comprises determining the first degree of interest based upon the one or more second set of objects.

27. The method of claim 26, further comprising:
inferring one or more classified relationships between the one or more second set of objects and the second object of interest based at least in part on the second dataset;
wherein the determining a second degree of interest for the second data point comprises determining the second degree of interest based on the one or more inferred classified relationships;
wherein the first dataset comprises a second text stream;
wherein the second data point corresponds to a portion of the second text stream.

28. One or more non-transitory machine-readable media for presenting a plurality of data points having instructions stored thereon, wherein the instructions, when executed by one or more processors, cause the one or more processors to execute operations comprising:
accessing, from a first source, a first dataset;
extracting the plurality of data points from the first dataset;
for a first data point of the plurality of data points corresponding to one or more first set of objects:
determining a first degree of interest for the first data point with respect to a center of interest on a first data layer of a plurality of data layers based on the one or more first set of objects, the center of interest representing an object of interest;
inferring one or more classified relationships between the one or more first set of objects and the object of interest;
determining a second degree of interest for the first data point on a second data layer of the plurality of data layers based on the one or more inferred classified relationships; and
aggregating the first degree of interest for the first data point and the second degree of interest for the first data point to determine a first aggregated degree of interest,
wherein the operations further comprise presenting a representation of the first data point based upon the first aggregated degree of interest on a data diagram, the data diagram including a representation of the center of interest and one or more representations of one or more data points of the plurality of data points.

29. The one or more non-transitory machine-readable media of claim 28, wherein the data diagram includes a first dimension representing the first data layer of the plurality of data layers;

wherein the data diagram includes a second dimension representing the second data layer of the plurality of data layers; and wherein the first dimension is different from the second dimension.

\* \* \* \* \*